United States Patent

Yoshida

[11] Patent Number: 5,659,387
[45] Date of Patent: Aug. 19, 1997

[54] DISTANCE MEASURING APPARATUS

[75] Inventor: Hideo Yoshida, Saitama-ken, Japan

[73] Assignee: Fuji Photo Optical Co., Ltd., Saitama-ken, Japan

[21] Appl. No.: 536,283

[22] Filed: Sep. 29, 1995

[30] Foreign Application Priority Data

Oct. 13, 1994 [JP] Japan .................... 6-247863
Oct. 13, 1994 [JP] Japan .................... 6-247864

[51] Int. Cl.$^6$ .................... G01C 3/08; G03B 13/18
[52] U.S. Cl. .................... 356/4.01; 396/120; 396/123
[58] Field of Search .................... 356/3.01, 3.04, 356/3.06, 3.11, 3.13, 4.01; 396/98, 120, 123

[56] References Cited

U.S. PATENT DOCUMENTS

| | | | |
|---|---|---|---|
| 4,938,588 | 7/1990 | Taniguchi | 356/1 |
| 4,967,223 | 10/1990 | Suzuki | 354/402 |
| 5,221,955 | 6/1993 | Inoue | 356/1 |
| 5,493,362 | 2/1996 | Nonaka | 354/403 |
| 5,534,991 | 7/1996 | Maeda et al. | 356/3.06 |

*Primary Examiner*—Mark Hellner
*Attorney, Agent, or Firm*—Leydig, Voit & Mayer

[57] ABSTRACT

A distance measuring apparatus comprises light emitting means for projecting light; light receiving means for receiving light; arithmetic means for performing arithmetic operation based on signals from the light receiving means; integrating means having an integrating capacitor, for integrating signals from the arithmetic means by discharging the integrating capacitor; detecting means for detecting distance based on signals from the integrating means; and charging means for performing preliminary charge of the integrating capacitor before the distance measurement is carried out. The present invention prevents voltage drop due to dielectric absorption of the integrating capacitor, thereby to solve problems of distance measurement error due to the voltage drop.

14 Claims, 11 Drawing Sheets

DISTANCE MEASURING APPARATUS

BACKGROUND OF THE INVENTION

1. Field of the Invention

The present invention relates to a distance measuring apparatus, and more particular to an active distance measuring apparatus used in cameras etc.

2. Related Background Art

Conventional active distance measuring apparatus for normal cameras are arranged to have an infrared light-emitting diode (hereinafter referred to as "IRED") and a position sensing device (hereinafter referred to as "PSD") for receiving infrared light emitted from the IRED and then reflected by an object, and are constructed in such an arrangement that signal currents output from the PSD are subjected to arithmetic processing in a signal processing circuit and an arithmetic circuit to obtain an output of distance information and that a microcomputer (hereinafter referred to as "CPU") detects a distance from the distance information.

Since an error could result from distance measurement with single emission of infrared light, a plurality of emissions, for example 256 emissions, are normally performed to obtain a plurality of distance data and then to integrate the plurality of distance data. Thus, the conventional distance measuring apparatus are normally provided with an integration circuit for integrating output signals from the arithmetic circuit.

SUMMARY OF THE INVENTION

The present inventor, however, found that the conventional distance measuring apparatus had the following problems.

Namely, the conventional active distance measuring apparatus as described above use a film capacitor which is expensive as an integrating capacitor in the integration circuit, but use of a ceramic capacitor which is cheap is desired from requirements to reduce the production cost. The ceramic capacitor, however, has a problem of a drop of charging voltage due to dielectric absorption.

Figure 1:
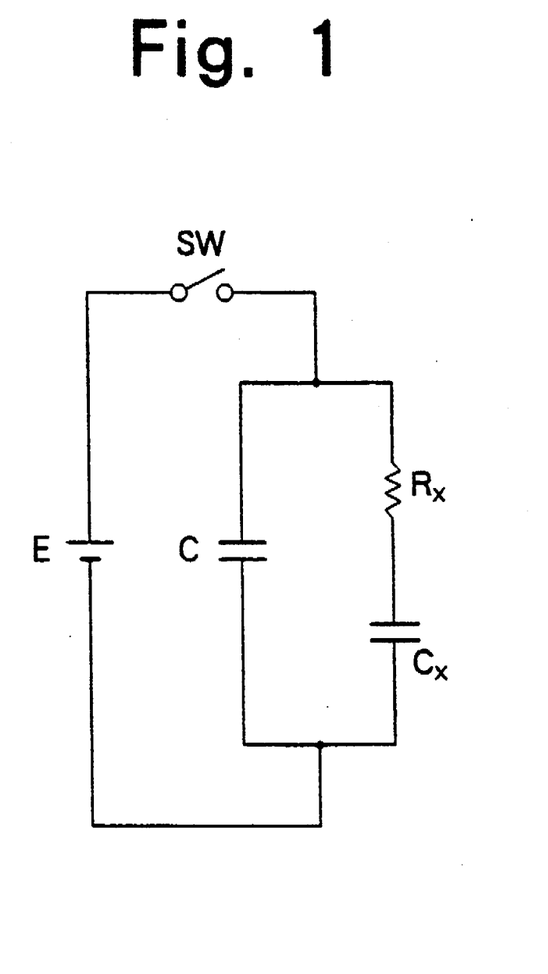
FIG. 1 is a circuit diagram to show an equivalent circuit for explaining the principle of dielectric absorption of a capacitor.

More specifically, the integrating capacitor C in the distance-measuring apparatus constitutes an equivalent circuit as shown in FIG. 1 immediately after start of first charge (which is first charge after the main power supply of a camera provided with the distance measuring apparatus is turned on). Thus, a certain voltage drop is observed because of a resistor component $R_x$ in FIG. 1 when a switch SW is made open after the first charging. This phenomenon is called as dielectric absorption.

Figure 2:
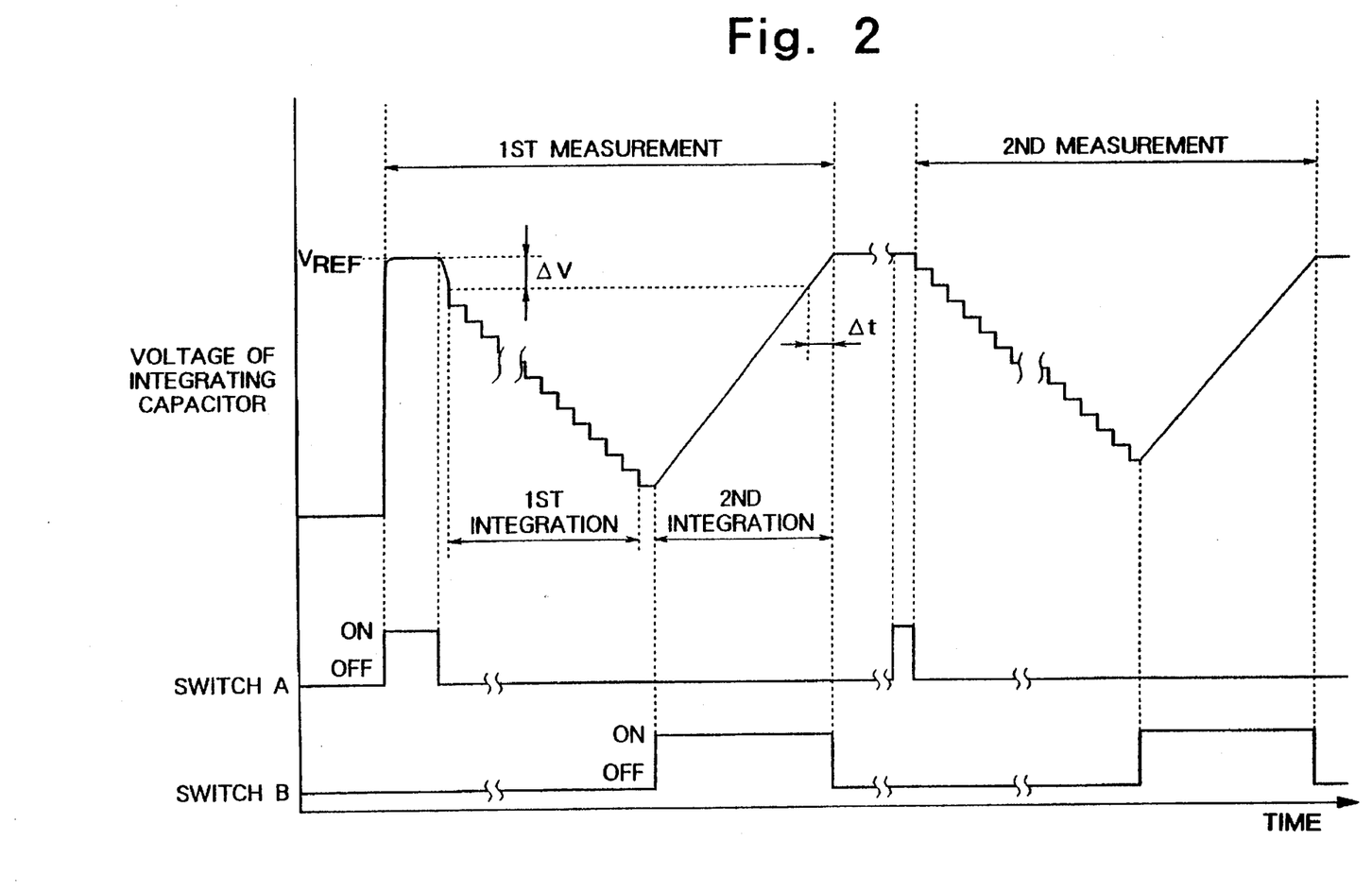
FIG. 2 is a timing chart to schematically show a time change of charging voltage of an integrating capacitor in a conventional distance measuring apparatus.

In cases where the ceramic capacitor is used as an integrating capacitor, the dielectric absorption causes a relatively great voltage drop ($\Delta V$) when a switch A for charging the integrating capacitor is opened after the capacitor has charged up to a reference voltage ($V_{REF}$) in the first distance measurement, as shown in FIG. 2. After that, first integration starts as successively inputting output signal voltages from the arithmetic circuit, corresponding to the respective emissions of infrared beams, into the integrating capacitor. Accordingly, a delay of $\Delta t$ corresponding to the voltage drop of $\Delta V$ appears in a time necessary for charging upon second integration for obtaining a sum of input signal voltages in the first distance measurement from a time (a time in which a switch B is on) which is given as a time elapsed until the above integrating capacitor charges at a constant rate back to the reference voltage ($V_{REF}$). This delay will be a cause of a distance-measuring error. Actually, the film capacitor also has a voltage drop due to dielectric absorption, but an amount of the drop is very small, and the dielectric absorption in the use of the film capacitor rarely affects the distance measurement.

The present invention has been accomplished taking the above problem into account, and an object of the invention is to provide an active distance measuring apparatus which can prevent the distance measuring error due to dielectric absorption of the integrating capacitor.

A distance measuring apparatus of the present invention comprises:

(a) light emitting means for projecting light for distance measurement toward a measured object;

(b) light receiving means for receiving light projected from said light emitting means and reflected by said measured object to output a signal according to a position of reception of the light;

(c) arithmetic means for performing an arithmetic operation based on the signal from said light receiving means to output signals corresponding to a distance from said light emitting means to the measured object;

(d) integrating means having an integrating capacitor, integrating the signals from said arithmetic means by discharging said integrating capacitor charged at a first voltage in accordance with the signals from said arithmetic means, and thereafter outputting a signal corresponding to an integration result obtained by recharging said integrating capacitor to said first voltage;

(e) detecting means for detecting said distance based on the signal from said integrating means to finish the distance measurement; and (f) charging means for performing preliminary charge (preferably, to said first voltage) of said integrating capacitor for a first period before the distance measurement is carried out by said means (a) to (e).

The above distance measuring apparatus of the present invention is preferably arranged to further comprise a main power supply connected to said distance measuring apparatus, wherein said charging means performs the preliminary charge of said integrating capacitor after said main power supply is turned on and before a first distance measurement is performed.

An embodiment of the above distance measuring apparatus of the present invention further comprises controlling means connected to said light emitting means, integrating means, and charging means, wherein said controlling means drives said charging means for the first period to preliminarily charge said integrating capacitor, thereafter drives said charging means for a second period to charge said integrating capacitor to said first voltage, and then drives said light emitting means and said integrating means to perform the distance measurement.

In a further preferred embodiment, after detecting that the distance measurement is not carried out over a predetermined time, said controlling means drives said charging means for the first period to preliminarily charge said integrating capacitor, thereafter drives said charging means for a second period to charge said integrating capacitor to said first voltage, and subsequently drives said light emitting means and said integrating means to perform the distance measurement.

The above distance measuring apparatus of the present invention is arranged to perform the preliminary charge in the integrating capacitor before the first distance measurement, thereby forcibly causing a voltage drop due to dielectric absorption before the distance measurement. Since the voltage drop due to dielectric absorption does not substantially appear in the second or subsequent charge unless the capacitor is left for a long time after the charge, the apparatus can avoid appearance of a distance measurement error caused by the voltage drop due to dielectric absorption in the first distance measurement after the above preliminary charge.

The distance measuring apparatus of the present invention may comprise, instead of the above charging means, (f) charging means for charging said integrating capacitor for a time long enough to prevent a voltage drop due to dielectric absorption, in the distance measurement by said means (a) to (e).

In this case, the distance measuring apparatus of the present invention preferably further comprises controlling means connected to said light emitting means, integrating means, and charging means, wherein, after detecting that the distance measurement is not carried out over a predetermined time, said controlling means drives said charging means for the time long enough to prevent the voltage drop due to dielectric absorption to charge said integrating capacitor to said first voltage, and subsequently drives said light emitting means and said integrating means to perform the distance measurement.

In this case, the distance measuring apparatus of the present invention is preferably arranged to further comprise a main power supply connected to said distance measuring apparatus, wherein after said main power supply is turned on, said charging means charges said integrating capacitor for the time long enough to prevent the voltage drop due to dielectric absorption in a first distance measurement. Further, the above controlling means is preferably connected to the main power supply, and, after the main power supply is turned on, the controlling means preferably drives the charging means for the time long enough to prevent the voltage drop due to dielectric absorption to charge the integrating capacitor to the first voltage, and then drives the light emitting means and the integrating means to perform the distance measurement.

The distance measuring apparatus of the present invention in this case is arranged to extend the charging time performed in the first distance measurement. Since the voltage drop due to dielectric absorption becomes very small after long charge, the apparatus can also avoid appearance of a distance measurement error caused by the voltage drop due to dielectric absorption in the first distance measurement in this case.

Furthermore, the distance measuring apparatus of the present invention may comprise, instead of the above charging means, (f) charging means for charging said integrating capacitor so as to apply a second voltage (preferably, a second voltage not less than a voltage obtained by adding a voltage corresponding to a voltage drop amount to said first voltage) higher than said first voltage to said integrating capacitor and thereafter to apply said first voltage to said integrating capacitor, in the distance measurement by said means (a) to (e).

In this case, the distance measuring apparatus of the present invention is preferably arranged to further comprise controlling means connected to said light emitting means, integrating means, and charging means, wherein said charging means comprises first charging means for applying said first voltage to said integrating capacitor, and second charging means for applying the second voltage higher than said first voltage to said integrating capacitor, and wherein said controlling means drives said first and second charging means for a first period, thereafter drives only said first charging means for a second period, and subsequently drives said light emitting means and said integrating means to perform the distance measurement.

More specifically, a preferred embodiment is so arranged that said charging means comprises a first power supply for applying said first voltage to said integrating capacitor, a second power supply for applying the second voltage higher than said first voltage to said integrating capacitor, a first switch for controlling a current flow from said first power supply to said integrating capacitor, and a second switch for controlling a current flow from said second power supply to said integrating capacitor and that said controlling means turns said first and second switches on and keeps them in an on state for a first period, then turns said second switch off and keeps only said first switch on for a second period, thereafter turns said first switch off, and subsequently drives said light emitting means and said integrating means to perform the distance measurement.

In a further preferred embodiment, after detecting that the distance measurement is not performed over a predetermined time, said controlling means drives said first and second charging means for a first period, thereafter drives only said first charging means for a second period, and subsequently drives said light emitting means and said integrating means to perform the distance measurement.

The distance measuring apparatus of the present invention in this case is so arranged as to first preliminarily apply to the integrating capacitor the second voltage higher than the first voltage (so-called reference voltage) upon start of discharge from the integrating capacitor in accordance with the signals from the arithmetic means and thereafter to return the voltage of the integrating capacitor to the first voltage (reference voltage), whereby the voltage drop due to dielectric absorption occurs before returning to the reference voltage. Therefore, this arrangement can also avoid appearance of a distance measurement error cause by the voltage drop due to dielectric absorption.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

The present invention will be explained in detail with the preferred embodiments thereof by reference to the accompanying drawings. In the drawings, same or corresponding portions will be denoted by same reference numerals.

Figure 3:
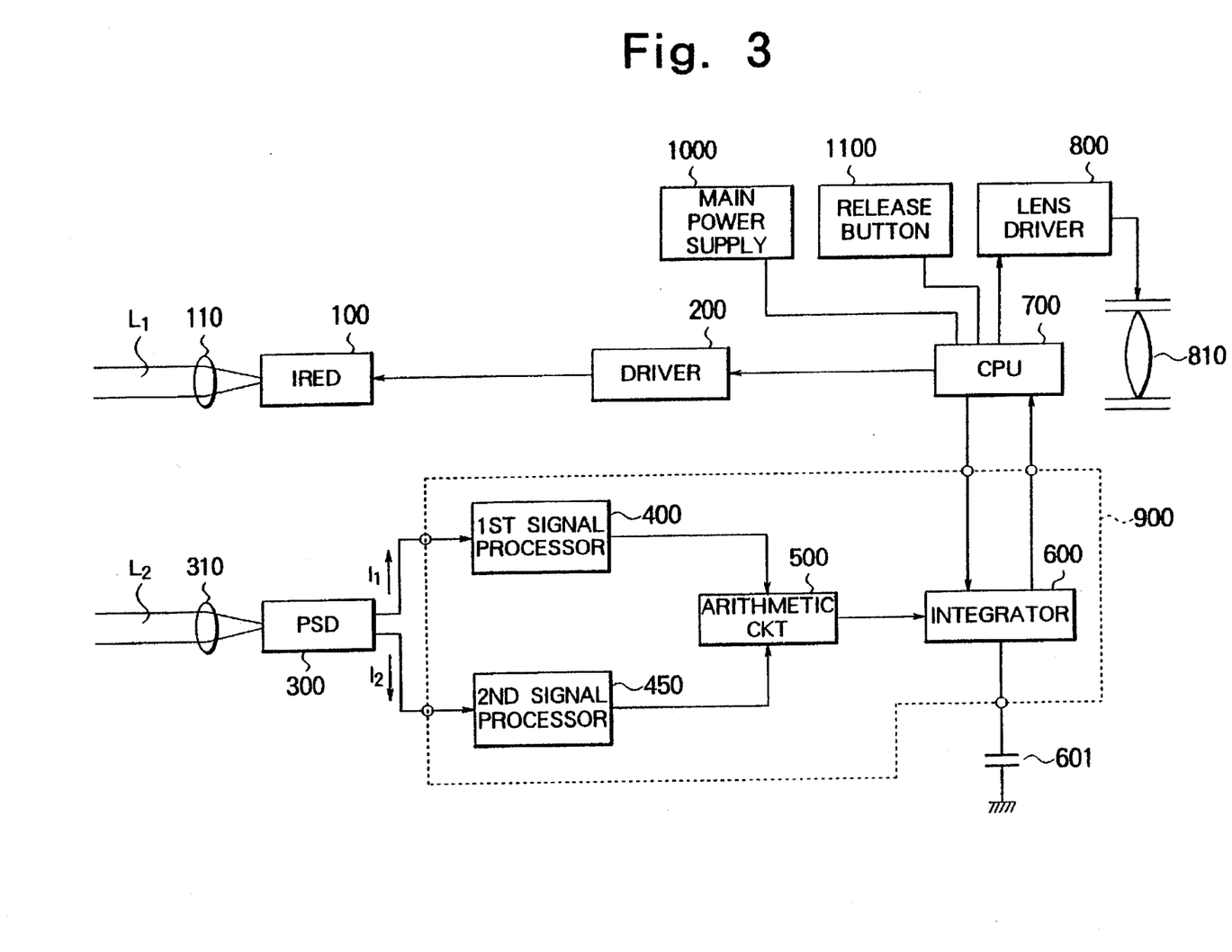
FIG. 3 is a block diagram to show the structure of an example of the distance measuring apparatus for camera to which the present invention can be applied.

FIG. 3 is a block diagram to schematically show an example of the structure of the active distance measuring apparatus according to the present invention, which can be applied to distance measuring apparatus for autofocusing cameras. This distance measuring apparatus is provided with an infrared emitting diode (IRED) 100 for projecting infrared light $L_1$ through a projecting lens 110 toward an object (distance-measuring object), a driver 200 for driving the IRED 100, and a position sensing device (PSD) 300 for receiving through a receiving lens 310 infrared light $L_2$ originally emitted from the IRED 100 and then reflected by the object.

The distance measuring apparatus further has a first signal processing circuit 400 and a second signal processing circuit 450 for processing signal current $I_1$ and signal current $I_2$, respectively, output from the PSD 300, an arithmetic circuit 500 for obtaining and outputting information on the distance to the object, based on the signals output from these signal processing circuits 400 and 450, an integration circuit 600 for integrating outputs from the arithmetic circuit 500, and a microcomputer (CPU) 700 for detecting the distance to the object, based on an output from the integration circuit 600 and controlling a lens drive circuit 800 to move a taking lens 810 to an in-focus position. The first and second signal processing circuits 400, 450, arithmetic circuit 500, and integration circuit 600 are normally built in an autofocusing integrated circuit (hereinafter referred to as "AFIC") 900, which is mounted in a camera. The CPU 700 is connected to a main power supply of camera (main power supply switch) 1000 and a release button (shutter release button) 1100.

The operation of this distance measuring apparatus is controlled by the CPU 700. The operation is schematically explained in the following. Upon measurement of distance, the IRED 100 first projects the infrared light $L_1$ through the projecting lens 110 toward the object. The infrared light $L_1$ is reflected by the object (as infrared light $L_2$), and the reflected light is received through the receiving lens 310 by the PSD 300. The PSD 300 is a photodiode for outputting two split electric currents from two electrodes depending upon a position of reception of the infrared light, and the signal current $I_1$ and signal current $I_2$ output from the PSD 300 are properly processed in the first signal processing circuit 400 and second signal processing circuit 450, respectively, and thereafter are input into the arithmetic circuit 500. The arithmetic circuit 500 obtains data equal to an output ratio $I_1/(I_1+I_2)$ of the outputs from PSD 300 and outputs the data as a signal of distance information.

In a single distance measuring operation, the IRED 100 supplies a plurality of (for example 256) pulse emissions of infrared light, and thus, the arithmetic circuit 500 outputs a corresponding number of signals of distance information. Accordingly, the integration circuit 600 integrates the same number of signals input thereinto as the number of emissions, and outputs a sum thereof as one distance information to the CPU 700. The CPU 700 obtains the distance to the object, based on the distance information thus input, and controls the lens drive circuit 800 to move the taking lens 810 to the in-focus position.

Figure 4:
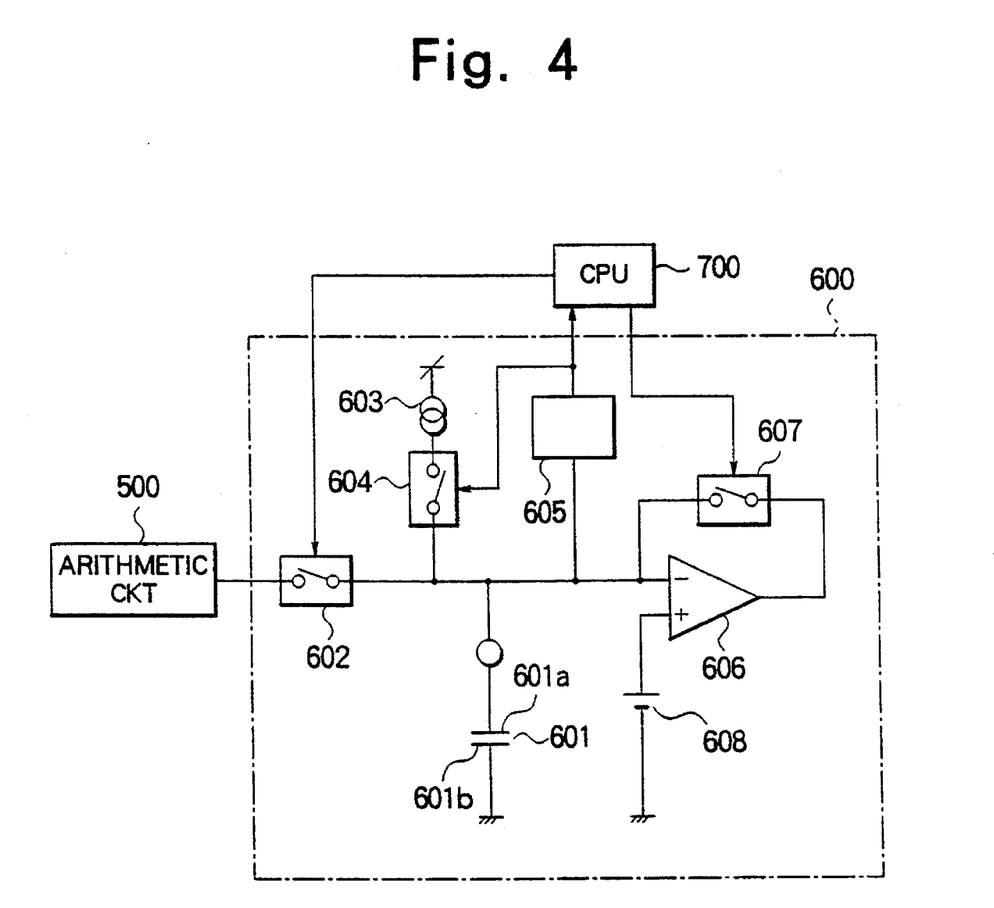
FIG. 4 is a block diagram to show the structure of an integration circuit in an embodiment of the distance measuring apparatus of the present invention.
Figure 5A:
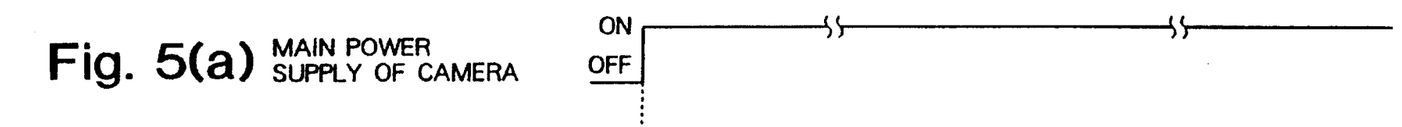
FIG. 5 is a timing chart to illustrate the operation in the embodiment of the distance measuring apparatus of the present invention.
Figures 5B, 5C, 5D:
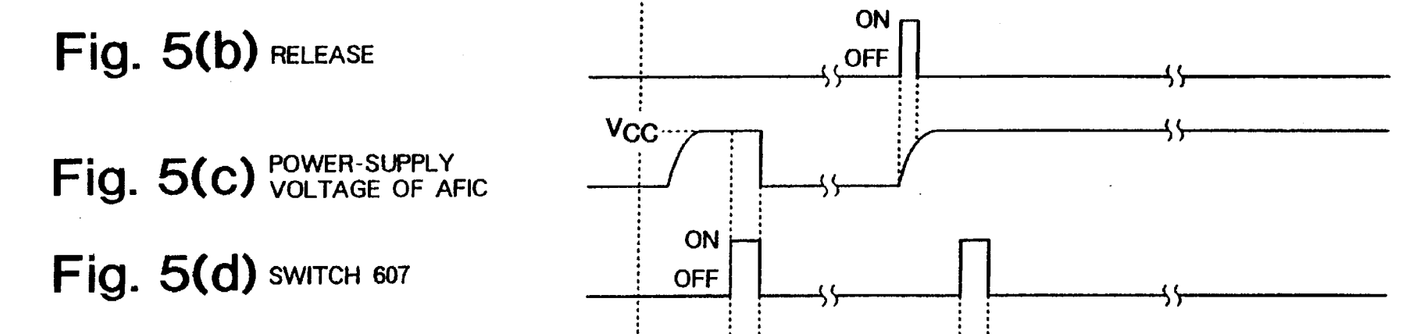
Figures 5E, 5F:
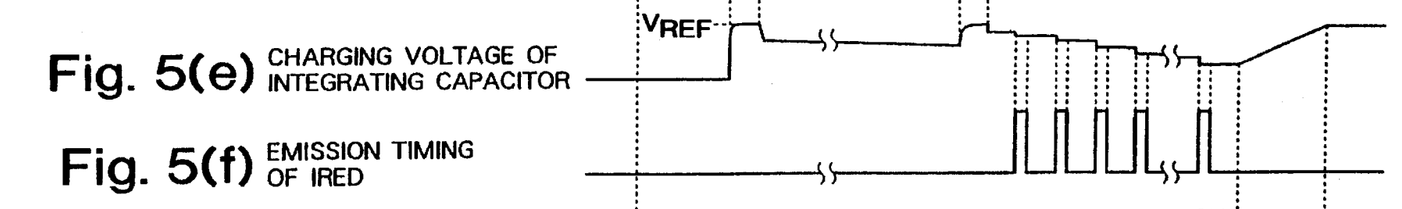
Figure 5G:
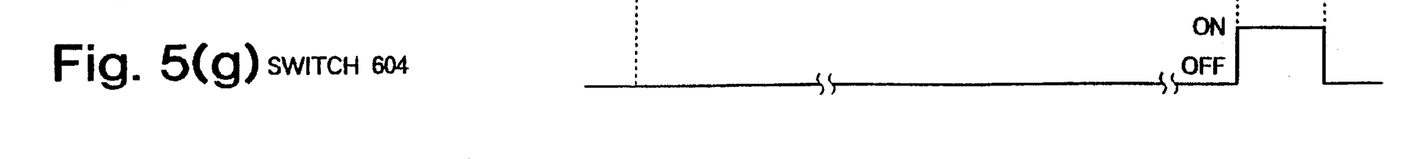
Figure 6:
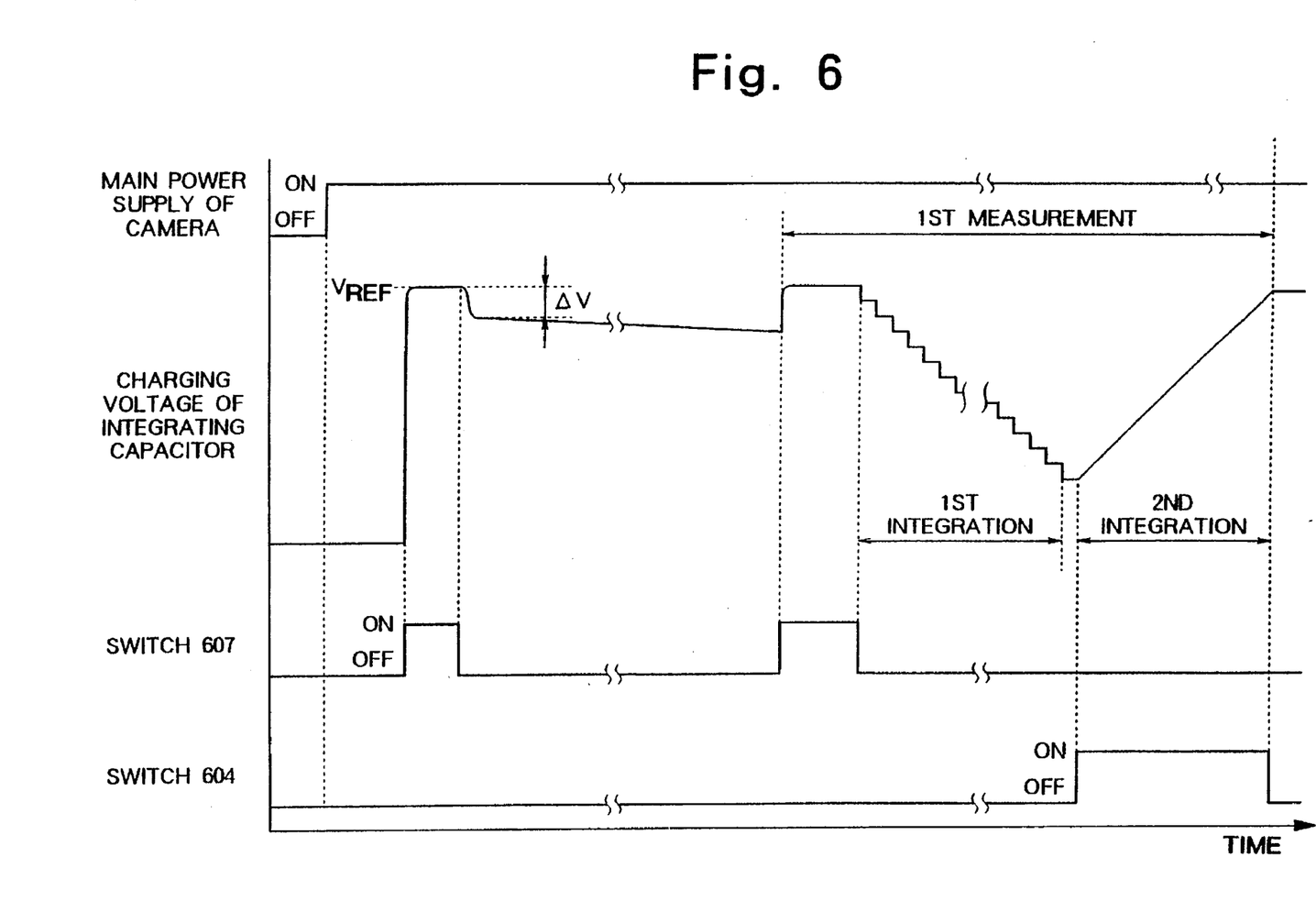
FIG. 6 is a timing chart to schematically show a time change of charging voltage of the integrating capacitor in the embodiment of the distance measuring apparatus of the present invention.
Figure 7A:
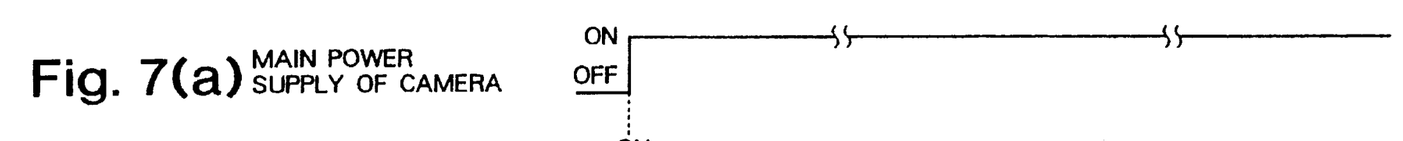
FIG. 7 is a timing chart to illustrate the operation in another embodiment of the distance measuring apparatus of the present invention.
Figure 7B:
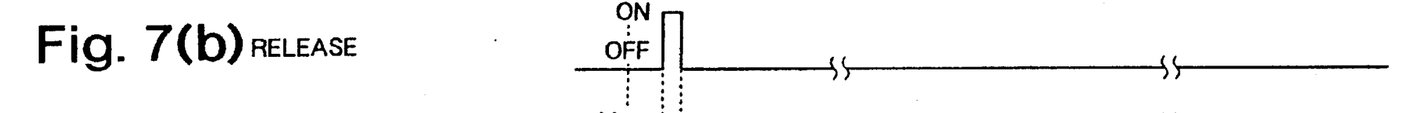
Figure 7C:
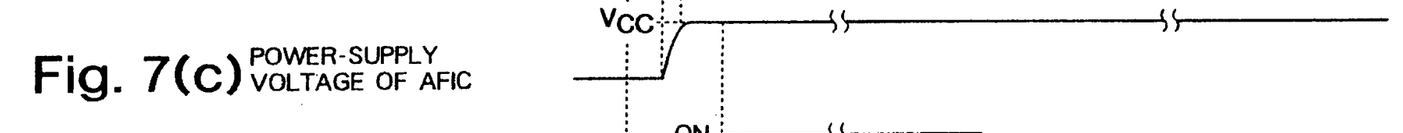
Figures 7D, 7E, 7F, 7G:
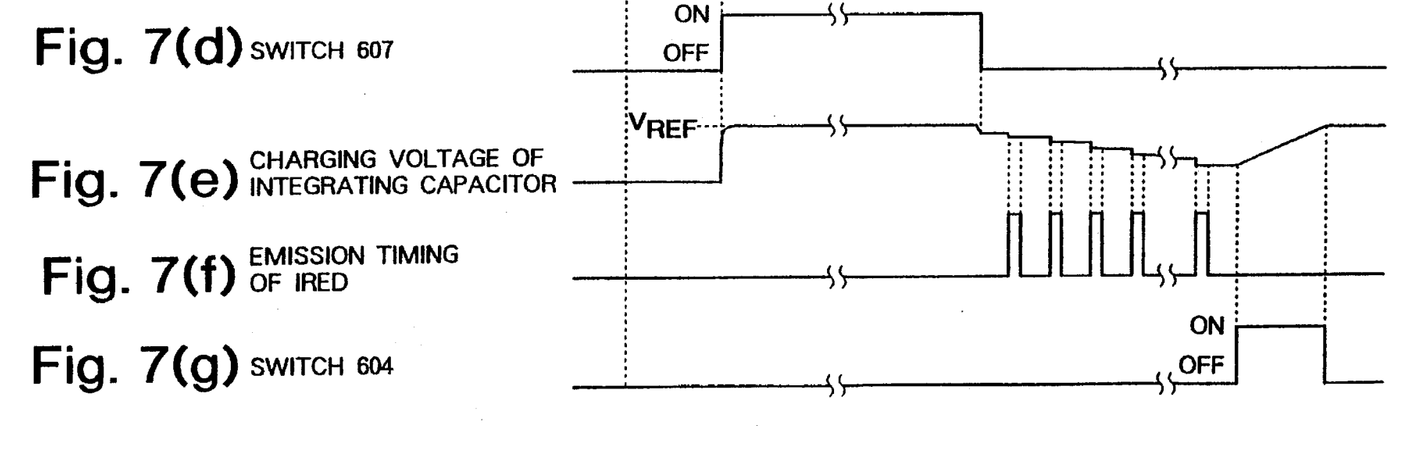

Here is first explained in detail an embodiment of the distance measuring apparatus of the present invention by reference to FIG. 4 to FIG. 6. The integration circuit 600 in the present embodiment is provided with a ceramic capacitor as an integrating capacitor 601, and this integrating capacitor 601 is mounted outside the AFIC 900. In the integration circuit 600 of the present embodiment, as shown in FIG. 4, one terminal 601b of the integrating capacitor 601 is connected to the earth and the other terminal 601a is connected to one terminal of the switch 602 controlled by a signal from the CPU 700. The other terminal of this switch 602 is connected to an output terminal of the arithmetic circuit 500. Also connected to the terminal 601a of the integrating capacitor 601 are a constant-current source 603 through a switch 604 controlled by the AFIC 900 (comparator 605), and a minus input terminal of an operational amplifier 606 for charging the integrating capacitor 601. A switch 607 controlled by the CPU 700 is connected between the minus input terminal and an output terminal of the operational amplifier 606, and a reference power supply 608 is connected to a plus input terminal of the operational amplifier 606. The above operational amplifier 606, switch 607, and reference power supply 608 compose a charging means for applying a reference voltage (first voltage: $V_{REF}$) to the integrating capacitor 601. Further, the above constant-current source 603 and switch 604 compose another charging means for recharging the integrating capacitor 601 at a constant rate in the second integration as detailed later.

In the present embodiment, the operation of the integration circuit 600 is performed as shown in the timing chart in FIG. 5. As shown in (a), (c), (d), and (e) of FIG. 5, when the main power supply 1000 of camera is turned on, the power-supply voltage of AFIC 900 starts rising and the integrating capacitor 601 charges. This charge starts when a control signal sent from the CPU 700 at a timing shown in (d) of FIG. 5 turns the switch 607 on, whereby the integrating capacitor 601 charges up to the reference voltage ($V_{REF}$) given by the reference power supply 608. This charge will be referred to as preliminary charge. After a given time (first period) elapses, the power supply of AFIC 900 is turned off and at the same time, the switch 607 is turned off to stop the charge to the integrating capacitor 601.

Next, as shown in (b) of FIG. 5, the release button 1100 of camera is half pressed to get into a distance-measuring state. Then the power-supply voltage of AFIC 900 again starts rising and the switch 607 is turned on to charge the integrating capacitor 601 up to the reference voltage ($V_{REF}$). After completion of the charge (or after a lapse of a second period), the switch 607 is turned off to be kept in that state.

As shown in (f) of FIG. 5; the IRED 100 is driven by emission timing signals of a duty ratio output from the CPU 700 to the driver 200, thereby supplying a plurality of (for example, 256 for each distance measurement) pulse emissions of infrared light. The infrared light $L_1$ emitted from the IRED 100 is reflected by the object (as $L_2$), and thereafter the reflected light $L_2$ is received by the PSD 300. Thus, the integration circuit 600 successively receives data of the output ratio $I_1/(I_1+I_2)$ obtained for the respective emissions in the arithmetic circuit 500. The CPU 700 controls the switch 602 at timings corresponding to the pulse emissions of IRED 100 to input negative voltages corresponding to the output ratios into the integrating capacitor 601.

FIG. 6 is a timing chart to schematically show a time change of charging voltage of the integrating capacitor 601 in the present embodiment. The signals from the arithmetic circuit 500 discharge the integrating capacitor 601 to decrease the potential of the terminal 601a stepwise with time (first integration). An amount of voltage drop in each step itself is distance information corresponding to the distance to the object, but the present embodiment employs a sum of voltage drop amounts obtained by pulse emissions of IRED 100, as distance information.

After completion of input in the number of pulse emissions (256) into the integrating capacitor 601, the switch 607 is kept in an off state and the switch 604 is turned on by a signal from the CPU 700. This charges (recharges) the integrating capacitor 601 at a constant rate determined by the rating of the constant-current supply 603 (second integration). When this charge returns the voltage of the integrating capacitor 601 to the reference voltage ($V_{REF}$), the comparator 605 turns the switch 604 off to stop the charge of the integrating capacitor 601.

The terminal 601a of the integrating capacitor 601 is connected through the comparator 605 to the CPU 700. This comparator 605 is so arranged that a pulse of "high" is output from AFIC 900 to CPU 700 between the start of charge and arrival at the reference voltage ($V_{REF}$) in the second integration. The CPU 700 continues measurement only while the output from the comparator 605 is "high," and is arranged to measure a time after the start of charge of the integrating circuit 601 and before the potential of the terminal 601a reaches the reference potential ($V_{REF}$), which is a time necessary for the second integration (or a time in which the switch 604 is on). Since the charging rate of the integrating capacitor 601 is constant, a sum of signal voltages input into the integrating capacitor 601 during one distance measurement can be obtained from the time required for the second integration. This corresponds to the output ratio $I_1/(I_1+I_2)$ obtained from the signal currents from the PSD 300. Accordingly, the distance to the object can be obtained using this data. After that, the CPU 700 controls the lens drive circuit 800, based on the thus obtained distance, to perform an appropriate focusing operation of the taking lens 810.

The first distance measurement in the present embodiment is completed in this manner, and as understood from FIG. 6, the voltage drop ($\Delta V$) due to dielectric absorption appears upon stop of the preliminary charge in the present embodiment because the integrating capacitor 601 preliminarily charges before start of distance measurement in the present embodiment. Since from the characteristics of capacitor no voltage drop due to the dielectric absorption occurs in the second charge unless it is left for a long time after charged, no voltage drop appears in the charge after the preliminary charge, i.e., in the charge at the first distance measurement. Accordingly, the first distance measurement includes no delay of the discharge time in the second integration due to the voltage drop, thus causing no error in distance measurement.

Because of the charge in the second integration, the second and subsequent distance measurements include no charge performed by the reference power supply 608 prior to the distance measuring routine (which includes the charge by the reference power supply 608), and the switch 607 is kept off as a general rule. However, after the distance measuring apparatus is left unused for a long time, the voltage of the integrating capacitor 601 could drop down to below the reference voltage ($V_{REF}$). Accordingly, in cases where the distance measurement is not performed for a long time, the switch 607 is turned on in the distance measuring routine to effect charging by the reference power supply 608, and in this case, the problem of voltage drop due to dielectric absorption would arise.

Thus, in the case of no distance measurement being performed for a long time, the CPU 700 closes the switch 607 at constant intervals of time to charge (preliminarily charge) the integrating capacitor 608, whereby no voltage drop appears in charging upon distance measurement, similarly in the case of the above-discussed preliminary charge, thus preferably preventing occurrence of a distance measurement error.

Although the above embodiment is so arranged that Upon preliminary charge the reference power supply 608 charges the integrating capacitor 601 up to the reference voltage ($V_{REF}$), charging may stop below the reference voltage depending upon the charging time, or the power supply of AFIC 900 may be used to charge the integrating capacitor up to the voltage (Vcc) of AFIC 900.

Figure 8:
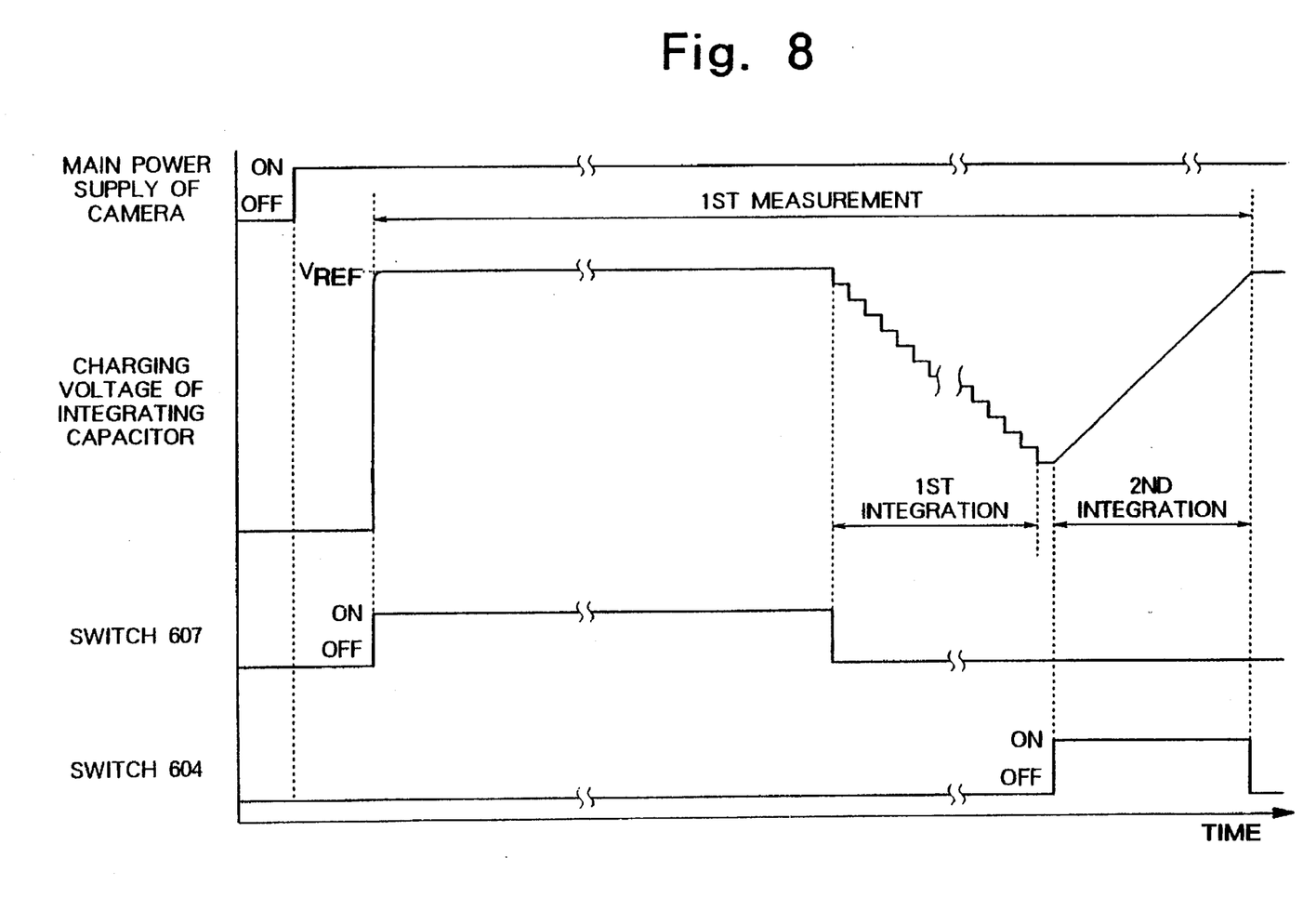
FIG. 8 is a timing chart to schematically show a time change of charging voltage of the integrating capacitor in the another embodiment of the distance measuring apparatus of the present invention.

Further, if the charging time is long enough to charge the integrating capacitor 601, there appears no voltage drop due to dielectric absorption of the integrating capacitor 601. Thus, occurrence of distance measurement error can be suppressed by making the time of charging by the reference power supply 608 in the first distance measurement sufficiently longer than that heretofore, as shown in FIG. 7 and FIG. 8, either without the above preliminary charge or with the preliminary charge. The charging time in this case is preferably set to a minimum time to permit the voltage drop due to dielectric absorption to be substantially eliminated from the viewpoint of preventing a delay of distance measuring operation. This method of extending the charging time is preferably applied to the cases of charging the integrating capacitor 601 by the reference power supply 608 as again closing the switch 607 by CPU 700 after the distance measurement is not performed for a long time.

The above description concerned the examples of the distance measuring apparatus of the present invention which prevent the voltage drop of the integrating capacitor causing a distance measurement error by performing the preliminary charge prior to the first distance measurement or setting a sufficiently long charging time in the first distance measurement, but such a voltage drop can also be prevented by temporarily applying a higher voltage than the reference voltage to the integrating capacitor, as detailed later.

Figure 9:
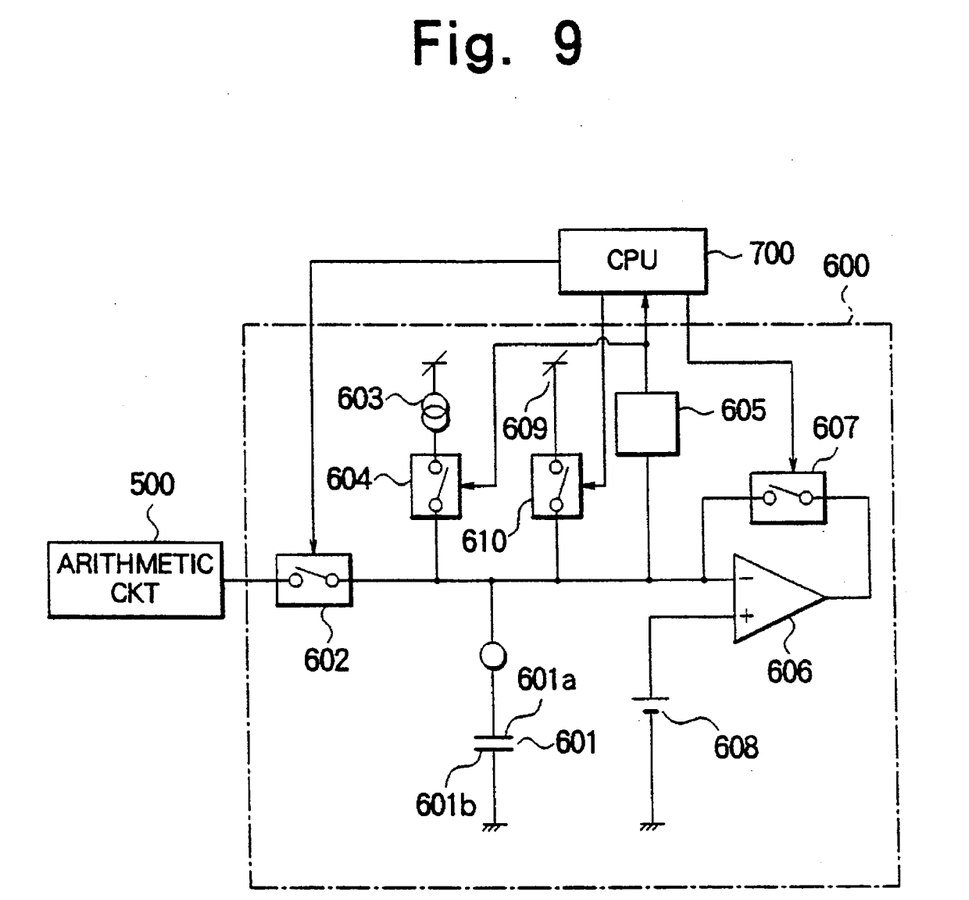
FIG. 9 is a block diagram to show the structure of an integration circuit in still another embodiment of the distance measuring apparatus of the present invention.
Figure 10A:
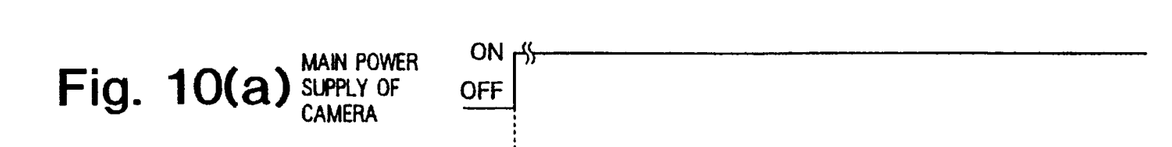
FIG. 10 is a timing chart to illustrate the operation in the still another embodiment of the distance measuring apparatus of the present invention.
Figure 10B:
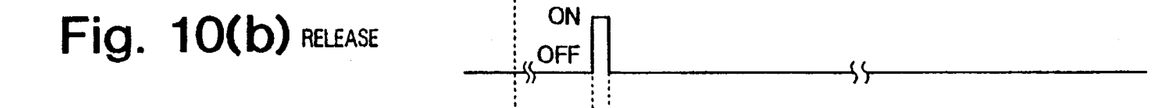
Figure 10C:
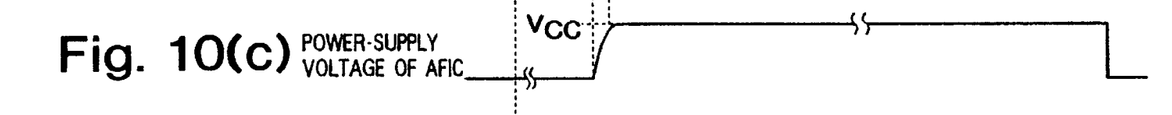
Figure 10D:
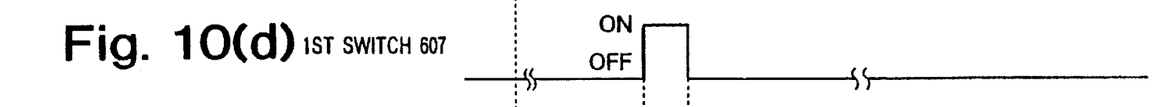
Figures 10E, 10F:
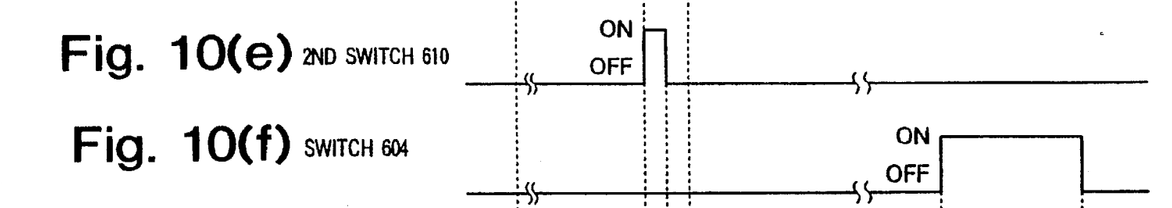
Figure 10G:
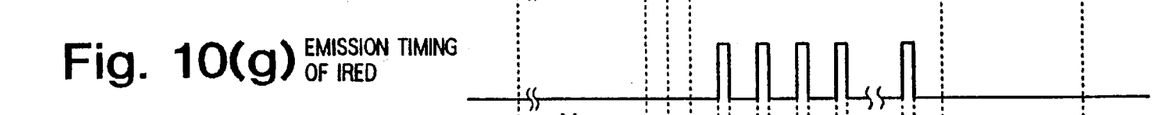
Figure 10H:
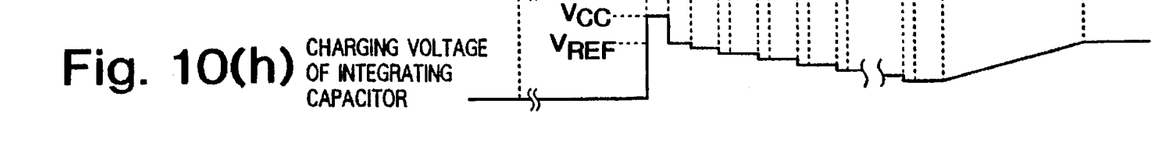

Another embodiment of the distance measuring apparatus of the present invention is next described in detail by reference to FIG. 9 to FIG. 11. The integration circuit 600 in the present embodiment is provided with a ceramic capacitor as an integrating capacitor 601, and this integrating capacitor 601 is mounted outside the AFIC 900. In the integrating circuit 600 of the present embodiment, as shown in FIG. 9, one terminal 601b of the integrating capacitor 601 is connected to the earth, and the other terminal 601a is connected to one terminal of the switch 602 controlled by a signal from the CPU 700. The other terminal of the switch 602 is connected to the output terminal of the arithmetic circuit 500. Also connected to the terminal 601a of the integrating capacitor 601 are the constant-current supply 603 through the switch 604 controlled by the comparator 605 and the minus input terminal of the operational amplifier 606 for charging the integrating capacitor 601. The switch (first switch) 607 controlled by the CPU 700 is connected between the minus input terminal and the output terminal of the operational amplifier 606, and the reference power supply (first power supply) 608 is connected to the plus input terminal of the operational amplifier 606. Further, different from the integration circuit previously shown in FIG. 4, the integration circuit 600 is so arranged that the power supply (second power supply) 609 of AFIC 900 is connected through a switch (second switch) 610 controlled by the CPU 700 to the terminal 601a of the integrating capacitor 601. The above operational amplifier 606, first switch 607, and first power supply 608 compose a first charging means for applying the reference voltage (first voltage: $V_{REF}$) to the integrating capacitor 601. Further, the above second power supply 609 and the second switch 610 compose a second charging means for applying a higher voltage (second voltage: Vcc) than the first voltage to the integrating capacitor 601. Further, the above constant-current supply 603 and switch 604 compose a third charging means for recharging the integrating capacitor 601 at a constant rate in the second integration, as detailed below.

In the present embodiment, the operation of the integration circuit 600 is performed in accordance with the timing chart shown in FIG. 10. In detail, as shown in (a) to (e) of FIG. 10, after the main power supply 1000 of camera is turned on and when the release button 1100 of camera is half pressed to start the first distance measurement, the power supply 609 of AFIC 900 starts rising, and after a lapse of a given stabilization time, the switch 607 and switch 610 are turned on. As a result, as shown in (h) of FIG. 10, the integrating capacitor 601 charges, so that the potential of the terminal 601a may become the voltage (Vcc) of the power supply 609. Next, after a lapse of a predetermined time (first period), the switch 607 is kept in an on state, but only the switch 610 is turned off. This results in fixing the charging voltage of the integrating capacitor 601 at the reference voltage ($V_{REF}$) of the reference power supply 608. After a predetermined charging time (second period) elapses, the switch 607 is turned off and is kept in that state.

Next, as shown in (g) of FIG. 10, the IRED 100 is driven by emission timing signals of the duty ratio output from the CPU 700 to the driver 200, thereby supplying a plurality of (for example, 256 for each distance measurement) pulse emissions of infrared light. The infrared light $L_1$ emitted from the IRED 100 is reflected by the object (as $L_2$) and thereafter the reflected light $L_2$ is received by the PSD 300, whereby the integrating circuit 600 will sequentially receive data of the output ratio $I_1/(I_1+I_2)$ obtained for the respective emissions by the arithmetic circuit 500. The CPU 700 controls the switch 602 at the timings corresponding to the pulse emissions of the IRED 100 to input negative voltages corresponding to the respective output ratios into the integrating capacitor 601.

Figure 11:
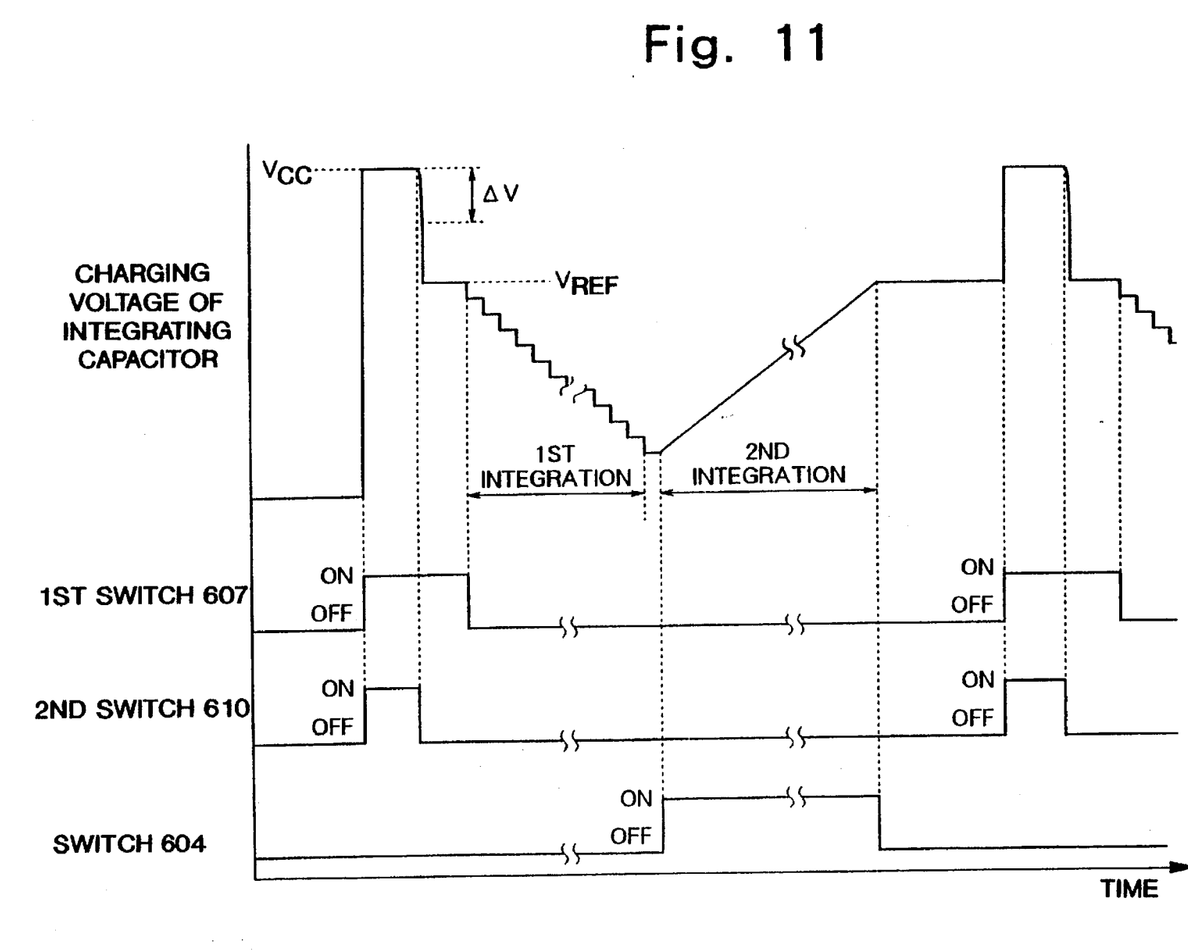
FIG. 11 is a timing chart to schematically show a time change of charging voltage of the integrating capacitor in the still another embodiment of the distance measuring apparatus of the present invention.

FIG. 11 is a timing chart to schematically show a time change of the charging voltage of the integrating capacitor 601 in the present embodiment. The signals from the arithmetic circuit 500 start discharging the integrating capacitor 601 to decrease the potential of the terminal 601a stepwise with time (first integration). Although an amount of voltage drop in each step, itself, is distance information corresponding to the distance to the object, the present embodiment employs a sum of voltage drop amounts obtained by the pulse emissions of IRED 100, as distance information.

After completion of inputs into the integrating capacitor 601 in the number of pulse emissions (256), as shown in (d) to (f) of FIG. 10, the switches 607, 610 are kept in an off state, and the switch 604 is turned on by a signal from the CPU 700. This results in charging (recharging) the integrating capacitor 601 at a constant rate determined by the rating of the constant-current source 603 (second integration). After this charging returns the voltage of the integrating capacitor 601 to the reference voltage ($V_{REF}$), the AFIC 900 makes the comparator 605 turn the switch 604 off to stop the charging of the integrating capacitor 601.

The terminal 601a of the integrating capacitor 601 is connected through the comparator 605 to the CPU 700. The CPU 700 counts a time when the output of comparator 605 is high, so that it can count a time after the start of charging of the integrating capacitor 601 and before the potential of the terminal 601a reaches the reference potential ($V_{REF}$), i.e., a time necessary for the second integration (which is a time in which the switch 604 is on). Since the charging rate of the integrating capacitor 601 is constant, a sum of signal voltages input into the integrating capacitor 601 in each distance measurement can be calculated from the time necessary for the second integration. This corresponds to the output ratio $I_1/(I_1+I_2)$ obtained from the signal currents from the PSD 300. Accordingly, the distance to the object can be obtained using this data. After that, the CPU 700 controls the lens drive circuit 800, based on the thus obtained distance, to perform an appropriate focusing operation of the taking lens 810.

The first distance measurement in the present embodiment is completed in this manner. As seen from FIG. 11, because in the present embodiment the greater voltage (Vcc) than the reference voltage ($V_{REF}$) is temporarily applied to the integrating capacitor 601 before the charging voltage of the integrating capacitor 601 is fixed to the reference voltage ($V_{REF}$), when the switch 610 is turned off, there appears a voltage drop ($\Delta V$) due to dielectric absorption in the voltage drop of from the voltage (Vcc) to the reference voltage ($V_{REF}$). In other words, the voltage drop ($\Delta V$) due to dielectric absorption is absorbed by temporarily raising the charging voltage to the higher voltage than the reference voltage ($V_{REF}$). From the characteristics of capacitor, the voltage drop due to dielectric absorption will not normally occur again unless the capacitor is left for a long time after charged. Therefore, after the switch 607 is turned off, the first integration is started from the reference voltage ($V_{REF}$). Accordingly, in the first distance measurement there is no delay of the charging time in the second integration due to a voltage drop, thus causing no distance measurement error.

If the distance measuring apparatus is left unused for a long time, the voltage of the integrating capacitor 601 could drop down to below the reference voltage ($V_{REF}$). Thus, in the cases where the distance measurement is not performed for a long time, the switch 607 is turned on to charge the capacitor by the reference power supply 608. On this occasion, the problem of voltage drop due to dielectric absorption would also occur. Thus, distance measurement after a lapse of a long time without execution of distance measurement is handled as first distance measurement, and the CPU 700 controls the switches 604, 607, 610 etc. at the same timings as shown in FIG. 10, thus preferably preventing appearance of a distance measurement error due to dielectric absorption.

Although the above embodiment is so arranged that the power supply 609 of the AFIC 900 charges the integrating capacitor 601, an extra power supply therefor may be separately provided. The voltage of the power supply may be one that can absorb the voltage drop due to dielectric absorption, and preferably, it is set to a voltage above a sum of the reference voltage ($V_{REF}$) and a voltage corresponding to the voltage drop amount ($\Delta V$). Further, in order to shorten the processing time, the above voltage is preferably set to a voltage as high as possible.

The present invention can also be applied to inverted cases of charging and discharging of the integration circuit from those in the above embodiments, that is, to integration circuits arranged to perform a plurality of charging operations to increase the charging voltage stepwise and thereafter to perform single discharging.

As described above, the present invention prevents the voltage drop due to dielectric absorption of the integrating capacitor in distance measurement by performing the preliminary charge prior to the first distance measurement, by temporarily applying the higher voltage than the reference voltage to the integrating capacitor, or by setting the charging time sufficiently long in the first distance measurement, thereby solving the problem of distance measurement error due to the voltage drop. For example, when the distance measuring apparatus of the present invention is applied to the autofocusing camera, the taking lens can be accurately moved to the in-focus position.

Also, the above effect achieved by the present invention is one obtainable independently of the type of integrating capacitor. Accordingly, the present invention permits a ceramic capacitor which is cheap to be used as the integrating capacitor instead of a film capacitor which is expensive, thereby reducing the production cost.

Further, the voltage drop due to dielectric absorption can be reduced by extending the charging time for the integrating capacitor, as described above; in the present invention, the above effect can be achieved even with a relatively short charging time of integrating capacitor if the above preliminary charge or the above temporary application of high voltage is applied, thereby preventing an increase of shutter time lag.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 247863/1994 (6-247863) filed on Oct. 13, 1994 and 247864/1994 (6-247864) filed on Oct. 13, 1994 are hereby incorporated by reference.

What is claimed is:

1. A distance measuring apparatus comprising:
   (a) light emitting means for projecting light for distance measurement toward a measured object;
   (b) light receiving means for receiving light projected from said light emitting means and reflected by said measured object to output signals according to a position of reception of the light;
   (c) arithmetic means for performing an arithmetic operation based on the signal from said light receiving means to output signals corresponding to a distance from said light emitting means to the measured object;
   (d) integrating means having an integrating capacitor, integrating the signals from said arithmetic means by discharging said integrating capacitor charged at a first voltage in accordance with the signals from said arithmetic means, and thereafter outputting a signal corresponding to an integration result obtained by recharging said integrating capacitor to said first voltage;
   (e) detecting means for detecting said distance based on the signal from said integrating means to finish a distance measurement; and
   (f) charging means for performing preliminary charge of said integrating capacitor for a first period before the distance measurement is carried out by said means (a) to (e).

2. A distance measuring apparatus according to claim 1, further comprising (g) a main power supply connected to said distance measuring apparatus, wherein said charging means performs the preliminary charge of said integrating capacitor after said main power supply is turned on and before a first distance measurement is performed.

3. A distance measuring apparatus according to claim 1, further comprising (h) controlling means connected to said light emitting means, integrating means, and charging means, wherein said controlling means drives said charging means for the first period to preliminarily charge said integrating capacitor, thereafter drives said charging means for a second period to charge said integrating capacitor to said first voltage, and then drives said light emitting means and said integrating means to perform the distance measurement.

4. A distance measuring apparatus according to claim 1, further comprising (g) a main power supply connected to said distance measuring apparatus; and
   (h) controlling means connected to said light emitting means, integrating means, charging means, and main power supply;
   wherein after said main power supply is turned on, said controlling means drives said charging means for the first period to preliminarily charge said integrating capacitor, thereafter drives said charging means for a second period to charge said integrating capacitor to said first voltage, and then drives said light emitting means and said integrating means to perform the distance measurement.

5. A distance measuring apparatus according to claim 1, further comprising (h') controlling means connected to said light emitting means, integrating means, and charging means, wherein after detecting that the distance measurement is not carried out over a predetermined time, said controlling means drives said charging means for the first period to preliminarily charge said integrating capacitor, thereafter drives said charging means for a second period to charge said integrating capacitor to said first voltage, and subsequently drives said light emitting means and said integrating means to perform the distance measurement.

6. A distance measuring apparatus according to claim 1, wherein said charging means preliminarily charges said integrating capacitor to said first voltage.

7. A distance measuring apparatus comprising:
   (a) light emitting means for projecting light for distance measurement toward a measured object;
   (b) light receiving means for receiving light projected from said light emitting means and reflected by said measured object to output a signal according to a position of reception of the light;

(c) arithmetic means for performing an arithmetic operation based on the signal from said light receiving means to output signals corresponding to a distance from said light emitting means to the measured object;

(d) integrating means having an integrating capacitor, integrating the signals from said arithmetic means by discharging said integrating capacitor charged at a first voltage in accordance with the signals from said arithmetic means, and thereafter outputting a signal corresponding to an integration result obtained by recharging said integrating capacitor to said first voltage;

(e) detecting means for detecting said distance based on the signal from said integrating means to finish a distance measurement;

(f) charging means for charging said integrating capacitor for a time long enough to prevent a voltage drop due to dielectric absorption, in the distance measurement by said means (a) to (e); and (g) controlling means connected to said light emitting means, integrating means, and charging means, which, after detecting that the distance measurement is not carried out over a predetermined time, drives said charging means for the time long enough to prevent the voltage drop due to dielectric absorption to charge said integrating capacitor to said first voltage, and subsequently drives said light emitting means and said integrating means to perform the distance measurement.

8. A distance measuring apparatus according to claim 7, further comprising (h) a main power supply connected to said distance measuring apparatus, wherein after said main power supply is turned on, said charging means charges said integrating capacitor for the time long enough to prevent the voltage drop due to dielectric absorption in a first distance measurement.

9. A distance measuring apparatus according to claim 7, further comprising (h) a main power supply connected to said distance measuring apparatus; and (g') controlling means connected to said light emitting means, integrating means, charging means, and main power supply;

wherein after said main power supply is turned on, said controlling means drives said charging means for the time long enough to prevent the voltage drop due to dielectric absorption to charge said integrating capacitor to said first voltage, and then drives said light emitting means and said integrating means to perform the distance measurement.

10. A distance measuring apparatus comprising:

(a) light emitting means for projecting light for distance measurement toward a measured object;

(b) light receiving means for receiving light projected from said light emitting means and reflected by said measured object to output a signal according to a position of reception of the light;

(c) arithmetic means for performing an arithmetic operation based on the signal from said light receiving means to output signals corresponding to a distance from said light emitting means to the measured object;

(d) integrating means having an integrating capacitor, integrating the signals from said arithmetic means by discharging said integrating capacitor charged at a first voltage in accordance with the signals from said arithmetic means, and thereafter outputting a signal corresponding to an integration result obtained by recharging said integrating capacitor to said first voltage;

(e) detecting means for detecting said distance based on the signal from said integrating means to finish a distance measurement; and (f) charging means for charging said integrating capacitor so as to apply a second voltage higher than said first voltage to said integrating capacitor and thereafter to apply said first voltage to said integrating capacitor, in the distance measurement by said means (a) to (e).

11. A distance measuring apparatus according to claim 10, further comprising (g) controlling means connected to said light emitting means, integrating means, and charging means, wherein said charging means comprises first charging means for applying said first voltage to said integrating capacitor, and second charging means for applying the second voltage higher than said first voltage to said integrating capacitor, and wherein said controlling means drives said first and second charging means for a first period, thereafter drives only said first charging means for a second period, and subsequently drives said light emitting means and said integrating means to perform the distance measurement.

12. A distance measuring apparatus according to claim 10, further comprising (g) controlling means connected to said light emitting means, integrating means, and charging means, wherein said charging means comprises a first power supply for applying said first voltage to said integrating capacitor, a second power supply for applying the second voltage higher than said first voltage to said integrating capacitor, a first switch for controlling a current flow from said first power supply to said integrating capacitor, and a second switch for controlling a current flow from said second power supply to said integrating capacitor and wherein said controlling means turns said first and second switches on and keeps said switches in an on state for a first period, then turns said second switch off and keeps only said first switch on for a second period, thereafter turns said first switch off, and subsequently drives said light emitting means and said integrating means to perform the distance measurement.

13. A distance measuring apparatus according to claim 10, further comprising (g') controlling means connected to said light emitting means, integrating means, and charging means, wherein said charging means comprises first charging means for applying said integrating capacitor to said first voltage, and second charging means for applying the second voltage higher than said first voltage to said integrating capacitor, and wherein after detecting that the distance measurement is not performed over a predetermined time, said controlling means drives said first and second charging means for a first period, thereafter drives only said first charging means for a second period, and subsequently drives said light emitting means and said integrating means to perform the distance measurement.

14. A distance measuring apparatus according to claim 10, wherein said charging means charges said integrating capacitor so as to apply to said integrating capacitor the second voltage not less than a voltage obtained by adding a voltage corresponding to a voltage drop amount to said first voltage, and then to apply said first voltage thereto.

* * * * *